June 30, 1942.    J. C. WALTON    2,288,054
METHOD OF MAKING RUBBER FLOORING
Filed July 15, 1939
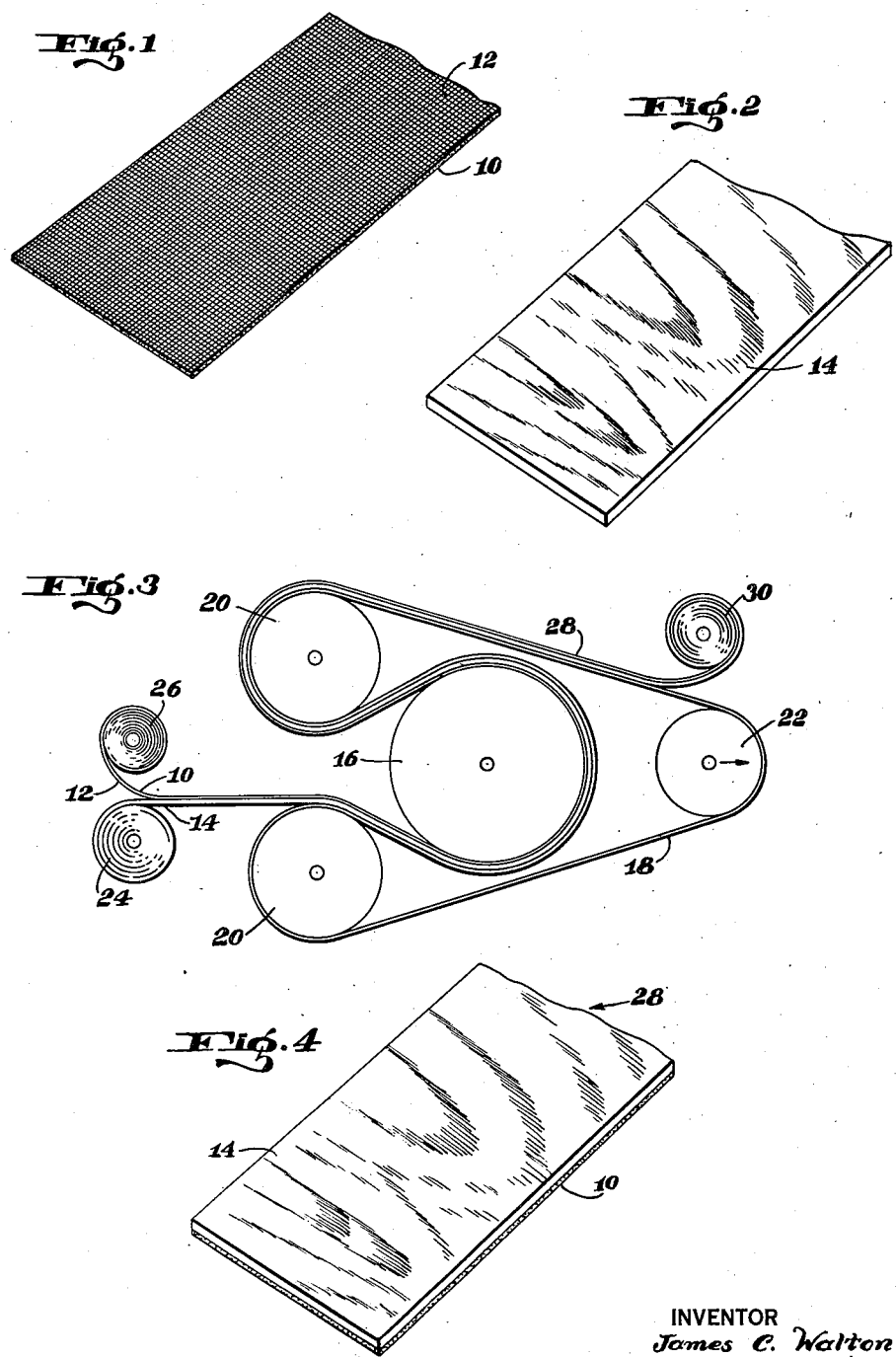
INVENTOR
James C. Walton
BY Kenway + Witter
ATTORNEY Patented June 30, 1942

2,288,054

UNITED STATES PATENT OFFICE 2,288,054

METHOD OF MAKING RUBBER FLOORING

James C. Walton, Newton Center, Mass., assignor to Boston Woven Hose & Rubber Company, Cambridge, Mass., a corporation of Massachusetts Application July 15, 1939, Serial No. 284,696

1 Claim. (Cl. 154—40)

This invention relates to rubber flooring and method of making the same and more particularly concerns compound rubber flooring wherein a relatively thick layer of rubber flooring material is backed up by a cushioning layer of sponge rubber, such two layers being joined together by vulcanization or adhesives at their meeting faces and being reinforced by sheeting of textile fabric at such faces. The production of an improved flooring of this nature comprises one object of the invention.

In proceeding with the manufacture of my improved flooring, I compound and form sponge rubber into sheets of the desired size and apply to one face thereof a reinforcing sheet of textile fabric. The face of the fabric sheet which is to contact the sponge rubber, and in some cases both faces, is rubberized by calendering or cement spreading whereby to adapt the same to adhere to a cooperating surface. Rubber flooring material in sheet form is combined with the sponge rubber-textile sheet as a backing to form my improved compound flooring, the two sheets being fed continuously into a vulcanizing machine. The rubber flooring material sheet is thus brought into contact with the textile fabric and both are vulcanized into a unit embodying a relatively thick rubber flooring top layer backed up by a sponge rubber under layer with the said textile sheeting therebetween. The novel method of producing my improved flooring and embodying the steps above and hereinafter more specifically described comprises a further object of the invention.

These and other features of the invention will be best understood and appreciated from the following description of certain embodiments thereof, selected for purposes of illustration and shown in the accompanying drawing, in which, Fig. 1 is a perspective view of a combined sponge rubber and textile fabric sheet forming a portion of my improved flooring.

Fig. 2 is a perspective view of a sheet of rubber flooring material adapted to be united to the sheet shown in Fig. 1, Fig. 3 is a diagrammatic view illustrating the continuous forming and vulcanizing of my improved flooring, Fig. 4 is a fragmentary perspective view of the finished flooring.

In making my improved flooring I first compound and prepare sponge rubber by any well known process and calender it into sheet form of the desired thickness. I then combine therewith on one face thereof a sheet of textile fabric preferably of one ply and rubberized by calendering or by cement spreading on one or both faces, the rubberizing adapting the fabric to adhere to the sponge rubber or such other rubber surface with which it is combined. The resulting sheet, illustrated in Fig. 1, comprises a layer 10 of sponge rubber having the textile fabric 12 fixed to one face thereof. The rubber of this sheet is then vulcanized. This composite sheet 10—12 and its production by forming the rubber into sponge either before or after the fabric is applied thereto is not new and I claim no novelty therein per se independently of the entire method of which this step is a part.

In Fig. 2 I have illustrated a relatively thicker sheet 14 of rubber flooring material which material comprises relatively dense but resilient rubber, this sheet and the sheet 10—12 being of the same width and in long lengths which can be conveniently rolled into rolls. The next step in the process comprises the combining and vulcanizing of these two sheets into a unit and this operation is conveniently and efficiently performed in a continuous vulcanizing machine of the nature illustrated in Fig. 3 and comprising a vulcanizing drum 16 about which extends an endless pressure band 18 supported on rolls 20 and 22 the band being tensioned by adjusting the roll 20 rearwardly.

A roll 24 of the material 10—12 and a roll 26 of the flooring strip 14 are placed in feeding position forwardly of the vulcanizing machines. The two strips are then led from the rolls into the bite between the drum 16 and the band 18, a rubber cement spreader coating being applied to the exposed face 12 prior to combining it with the sheet 14. The tension of the band 18 compresses the two sheets into intimate contact and the heated drum 16 serves to vulcanize the sheet 14 and to vulcanize the two sheets together during their passage around the drum. The finished flooring 28 is rolled into a roll 30 directly from the machine and is thereupon ready for inspection.

Having thus described my invention what I claim as new and desire to secure by Letters Patent of the United States is,

A method of making resilient flooring in continuous strip form and embodying a top wear-resistant layer of relatively dense and cured rubber and a relatively thinner bottom layer of cured sponge rubber vulcanized into face to face contact with a textile fabric sheet which is bonded between and to the top and bottom layers, which consists in compounding and forming sponge rubber into a sheet strip of predetermined thickness and width, bonding a textile fabric backing strip to one face of the sponge rubber strip, vulcanizing the sponge rubber strip, applying a vulcanizable adhesive coating to the exposed face of the textile fabric backing strip, continuously feeding the resulting composite sheet and a relatively dense and thicker sheet of unvulcanized rubber together in parallel relation through an arcuate vulcanizing field of substantial length with the coated face of the fabric backing strip in face to face contact with the dense rubber sheet, and continuously compressing said sheets into firm face to face contact and continuously vulcanizing the rubber of the relatively dense sheet and the compressed sheets into a unit at their contacting faces as the sheets pass through said field, thereby producing the said resilient flooring continuously and in continuous lengths.

JAMES C. WALTON.